US010811936B2

(12) United States Patent
Finke et al.

(10) Patent No.: US 10,811,936 B2
(45) Date of Patent: Oct. 20, 2020

(54) GENERATOR SYSTEMS

(71) Applicant: Hamilton Sundstrand Corporation, Charlotte, NC (US)

(72) Inventors: Aaron M. Finke, Janesville, WI (US); Andreas C. Koenig, Rockford, IL (US); Stephen Michael Bortoli, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/242,212

(22) Filed: Jan. 8, 2019

(65) Prior Publication Data

US 2020/0220430 A1 Jul. 9, 2020

(51) Int. Cl.
*H02K 7/18* (2006.01)
*F02C 7/32* (2006.01)
*H02P 101/30* (2015.01)

(52) U.S. Cl.
CPC .............. *H02K 7/1823* (2013.01); *F02C 7/32* (2013.01); *F05D 2220/764* (2013.01); *H02P 2101/30* (2015.01)

(58) Field of Classification Search
CPC ..... H02K 7/1823; F02C 7/32; H02P 2101/30; F05D 2220/764
See application file for complete search history.

(56) References Cited

U.S. PATENT DOCUMENTS

| 7,605,483 | B2 * | 10/2009 | Kern | ....................... | H02P 9/302 |
| | | | | | 290/4 A |
| 8,304,927 | B2 * | 11/2012 | Cote | ........................ | H02P 9/04 |
| | | | | | 290/32 |
| 8,624,415 | B2 * | 1/2014 | Koenig | ................... | H02K 16/02 |
| | | | | | 290/52 |
| 9,154,067 | B2 * | 10/2015 | Frampton | ................ | H02P 9/04 |

(Continued)

FOREIGN PATENT DOCUMENTS

| EP | 2099111 A2 | 9/2009 |
| EP | 2728141 A2 | 5/2014 |

OTHER PUBLICATIONS

Extended European Search Report dated Apr. 23, 2020, issued during the prosecution of European Patent Application No. EP 19208980.3.

*Primary Examiner* — Tulsidas C Patel
*Assistant Examiner* — Joseph Ortega
(74) *Attorney, Agent, or Firm* — Locke Lord LLP; Daniel J. Fiorello; Scott D. Wofsy

(57) ABSTRACT

A system can include a first generator configured to operate in a first speed range to produce a predetermined output characteristic, a second generator configured to operate at a second speed range different from the first speed range to produce the predetermined output characteristic, and a controller configured to activate the first generator at and/or above a first low activation speed and at and/or below a first high activation speed within the first speed range. The controller can be configured to activate the second generator (Continued)

at and/or above a second low activation speed within the second speed range. The controller can be configured to deactivate the first generator at and/or above a first high deactivation speed. The controller can be configured to deactivate the second generator at and/or below a second low deactivation speed.

16 Claims, 3 Drawing Sheets

(56) References Cited

U.S. PATENT DOCUMENTS

| | | | |
|---|---|---|---|
| 9,257,838 B2 * | 2/2016 | Gataric | H02J 1/12 |
| 9,621,090 B2 * | 4/2017 | Chong | H02K 7/1823 |
| 9,755,458 B2 * | 9/2017 | Frampton | H02J 3/381 |
| 2006/0042252 A1 * | 3/2006 | Derouineau | F02C 9/26 |
| | | | 60/703 |
| 2008/0150494 A1 * | 6/2008 | Lemmers | H02P 9/302 |
| | | | 322/6 |
| 2012/0286516 A1 * | 11/2012 | Chong | H02K 7/1823 |
| | | | 290/52 |
| 2013/0062885 A1 * | 3/2013 | Taneja | F01D 15/10 |
| | | | 290/1 A |
| 2015/0180393 A1 * | 6/2015 | Tesch | H02P 9/04 |
| | | | 307/87 |
| 2015/0244296 A1 * | 8/2015 | Edwards | F01D 15/10 |
| | | | 290/40 B |
| 2015/0311903 A1 * | 10/2015 | Frampton | H03L 5/02 |
| | | | 700/287 |
| 2016/0218650 A1 * | 7/2016 | Gajanayake | F01D 15/12 |
| 2017/0170762 A1 * | 6/2017 | Blackwelder | H02P 6/20 |
| 2018/0202310 A1 * | 7/2018 | Suciu | F01D 25/20 |
| 2018/0291817 A1 * | 10/2018 | Suciu | F02C 7/36 |
| 2018/0316220 A1 * | 11/2018 | Frampton | H02J 3/46 |
| 2019/0067950 A1 * | 2/2019 | Zhang | H02J 3/40 |

* cited by examiner

GENERATOR SYSTEMS

BACKGROUND

1. Field

This disclosure relates to electrical generator systems, e.g., configured for use with turbomachines for aircraft.

2. Description of Related Art

Traditional aircraft generator systems cannot use the low pressure spool instead of the high pressure spool to drive a variable frequency generator (VFG) to provide electrical power. The VFG's speed range is determined by the desired output frequency range, e.g., about 360 Hz to about 800 Hz (e.g., a 2.2:1 speed ratio which is in line with the high pressure spool engine). However, the low pressure spool engine has a wide speed range (e.g., about 5:1 or greater) which prevents utilizing a traditional generator.

Such conventional methods and systems have generally been considered satisfactory for their intended purpose. However, there is still a need in the art for improved generator systems. The present disclosure provides a solution for this need.

SUMMARY

In accordance with at least one aspect of this disclosure, a system can include a first generator configured to operate in a first speed range to produce a predetermined output characteristic, a second generator configured to operate at a second speed range different from the first speed range to produce the predetermined output characteristic, and a controller configured to activate the first generator at and/or above a first low activation speed and at and/or below a first high activation speed within the first speed range. The controller can be configured to activate the second generator at and/or above a second low activation speed within the second speed range. The controller can be configured to deactivate the first generator at and/or above a first high deactivation speed. The controller can be configured to deactivate the second generator at and/or below a second low deactivation speed.

The first and second generators can be a variable frequency generator. The controller can be configured to provide excitation energy to the first generator at and/or above the first low activation speed and at and/or below the first high activation speed within the first speed range. The controller can be configured to provide excitation energy to the second generator at and/or above the second activation speed in the second speed range to operate each of the first generator or the second generator as a function of speed.

In certain embodiments, the system can include a permanent magnet generator (PMG) connected to the controller to provide the excitation energy. Any suitable excitation energy source is contemplated herein.

In certain embodiments, the first generator and the PMG can be connected to a first shaft. In certain embodiments, the first generator can be connected to a first shaft and the second generator can be connected to a second shaft different from the first shaft.

In certain embodiments, the system can include a third generator, e.g., connected to the second shaft with the second generator. The third generator can be configured to operate in a third speed range different from the first and second speed ranges to produce the predetermined output characteristic. The controller can be configured to activate the third generator at a third low activation speed in the third speed range and to deactivate the third generator at a third low deactivation speed. The controller can be configured to deactivate the second generator at and/or above a second high deactivation speed and to activate the second generator at and/or below a second high activation speed.

In certain embodiments, each high deactivation speed can be about the same as a next generator low activation speed, and each low deactivation speed can be about the same as a next generator high activation speed such that the controller can be configured to activate one generator and deactivate another generator at the same speed.

In certain embodiments, the first shaft can be connected to an input shaft via a first gear assembly having a first gear ratio. In certain embodiments, the second shaft can be connected to an input shaft via a second gear assembly having a second gear ratio.

The first generator and the second generator can be connected to a low speed spool of a turbomachine to be driven by the low speed spool of the turbomachine. Any other suitable spool or power source is contemplated herein.

In certain embodiments, the first speed range can partially overlap with the second speed range, but not with the third speed range. The third speed range can partially overlap with the second speed range.

The controller can be configured to switch between each generator within an overlapping speed range. The controller can be configured to provide generator switching control hysteresis such that each low activation speed is higher than a respective low deactivation speed.

In certain embodiments, each high activation speed can be about the same as each high deactivation speed, and each low deactivation speed can be about the same as each low activation speed. Any suitable activation and deactivation speeds are contemplated herein (e.g., the limits of each speed range, one or more points within a speed range, etc.).

In accordance with at least one aspect of this disclosure, a method can include controlling at least a first generator and a second generator attached to a low speed spool of a turbomachine to output a predetermined output characteristic. The first generator can be configured to operate in a first speed range to produce a predetermined output characteristic. The second generator can be configured to operate at a second speed range different from the first speed range to produce the predetermined output characteristic.

Controlling can include deactivating the first generator at and/or above a first high deactivation speed within the first speed range, and activating the second generator at and/or above a second low activation speed within the second speed range. Activing can include providing excitation energy to a respective generator. Deactivating can include not providing excitation energy to the respective generator. Controlling can include activating only a single generator in an overlapping speed range.

In accordance with at least one aspect of this disclosure, a method for providing an electrical output having a predetermined characteristic can include switching between a plurality of generators connected to a low speed spool of a turbomachine as a function speed to produce the electrical output having the predetermined characteristic. Any other suitable methods and/or portions thereof are contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
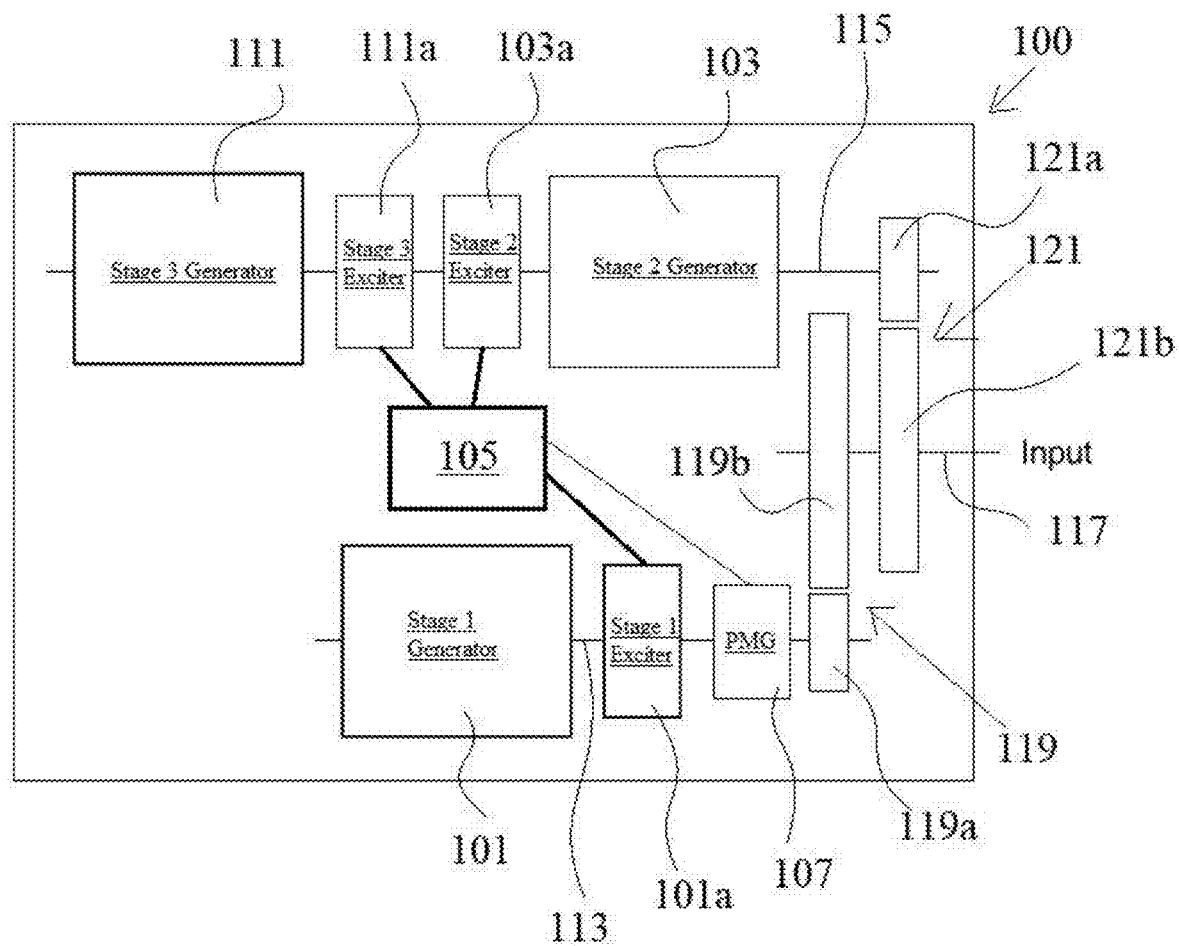
FIG. 1 is a schematic of an embodiment of a system in accordance with this disclosure.
Figure 2:
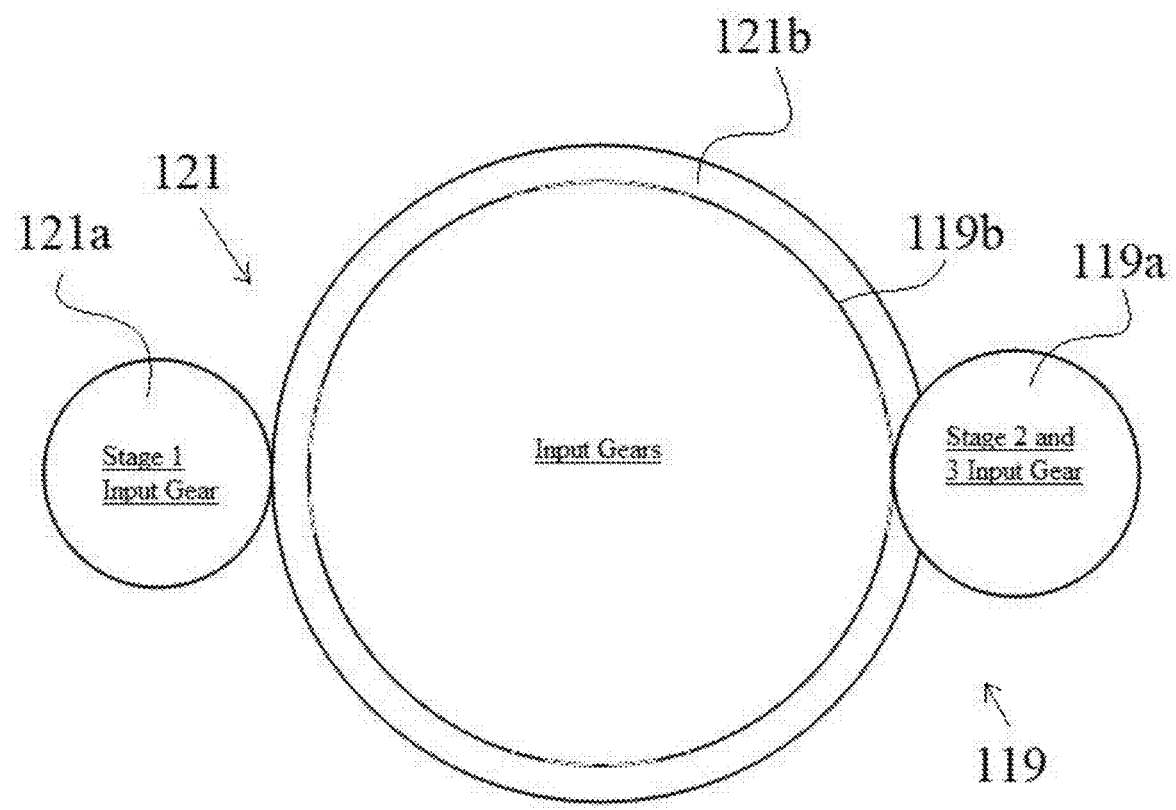
FIG. 2 is a schematic plan view of gearing assemblies of the embodiment of FIG. 1.
Figure 3:
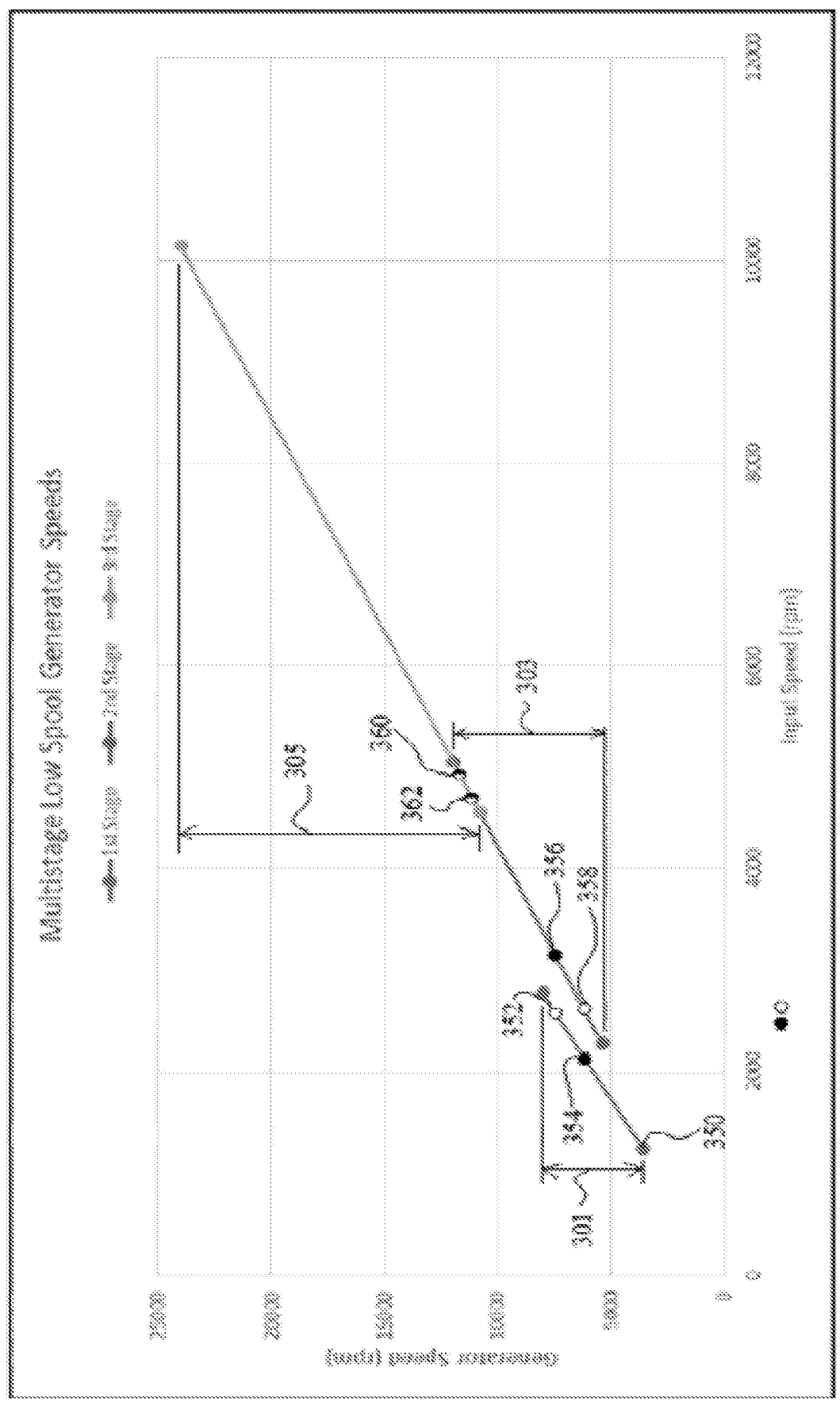
FIG. 3 is a chart showing an embodiment of generator stage speed ranges.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-3. Certain embodiments described herein can be used to provide desired generator output using a driving source that has a wide speed range (e.g., a low pressure spool of a turbomachine).

In accordance with at least one aspect of this disclosure, referring to FIG. 1, a system 100 can include a first generator 101 configured to operate in a first speed range (e.g., between about 3,600 RPM to about 8,000 RPM as shown in FIG. 3) to produce a predetermined output characteristic (e.g., between about 360 Hz and about 800 Hz frequency, or any other suitable frequency for use with aircraft electronics). In certain embodiments, the first generator 101 can be a variable frequency generator (e.g., having 12 poles to produce between about 360 Hz and about 800 Hz at a speed between about 3,600 RPM to about 8,000 RPM).

The system 100 can include a second generator 103 configured to operate at a second speed range (e.g., between about 5,400 RPM and about 12,000 RPM) different from the first speed range to produce the predetermined output characteristic. In certain embodiments, the second generator 103 can be a variable frequency generator (e.g., having 8 poles to produce between about 360 Hz and about 800 Hz at a speed between about 5,400 RPM and about 12,000 RPM).

The system 100 can include a controller 105 configured to activate the first generator 101 at and/or above a first low activation speed (e.g., a speed 350 at or above about 3,600 RPM as shown in FIG. 3) and at and/or below a first high activation speed (e.g., a speed 354 at or below 8,000 RPM) within the first speed range. The controller 105 can be internal or external to the generator system. The controller 105 can be configured to activate the second generator 103 at and/or above a second low activation speed (e.g., a speed 356 at or above about 5,400 RPM) within the second speed range. The controller 105 can be configured to deactivate the first generator 101 at and/or above a first high deactivation speed (e.g., a speed 352 at or below about 8,000 RPM). The controller 105 can be configured to deactivate the second generator 103 at and/or below a second low deactivation speed (e.g., a speed 358 at or below about 12,000 RPM).

For example, to activate certain embodiments of generators that are variable frequency generators, the controller 105 can be configured to cause excitation energy to flow to the generators (e.g., via exciters 101a, 103a, 111a as shown), e.g., as appreciated by those having ordinary skill in the art in view of this disclosure. In certain embodiments, the controller 105 can be configured to provide excitation energy to the first generator 101 at and/or above the first low activation speed and at and/or below the first high activation speed within the first speed range. Also, the controller 105 can be configured to provide excitation energy to the second generator 103 at and/or above the second activation speed in the second speed range to operate each of the first generator 101 or the second generator 103 as a function of speed.

In certain embodiments, the system can include a permanent magnet generator (PMG) 107 operatively connected to the controller 105 to provide the excitation energy. Any suitable excitation energy source (e.g., through other aircraft power electronics) is contemplated herein.

In certain embodiments, the first generator 101 and the PMG 107 can be connected to a first shaft 113. In certain embodiments, the first generator 101 can be connected to a first shaft 113 and the second generator 103 can be connected to a second shaft 115 different from the first shaft 113, e.g., as shown in FIG. 1.

In certain embodiments, the system 100 can include a third generator 111, e.g., connected to the second shaft 115 with the second generator 103, and/or any other additional generators. The third generator 111 can be connected to any suitable shaft (e.g., the first, second, or a third shaft). The third generator 111 can be configured to operate in a third speed range (e.g., between about 10,800 RPM and about 24,000 RPM) which is different from the first and second speed ranges to produce the predetermined output characteristic, e.g., as described above. In certain embodiments, the third generator 111 can be a variable frequency generator (e.g., having 4 poles to produce between about 360 Hz and about 800 Hz at a speed between about 10,800 RPM and about 24,000 RPM).

The controller 105 can be configured to activate the third generator 111 at a third low activation speed (e.g., a speed 360 at or above about 10,800 RPM) in the third speed range and to deactivate the third generator 111 at a third low deactivation speed (e.g., a speed 362 at or above 10,800 RPM). The controller 105 can be configured to deactivate the second generator 103 at and/or above a second high deactivation speed (e.g., a speed 360 at or below about 12,000 RPM) and to activate the second generator 103 at and/or below a second high activation speed (e.g., a speed 362 at or below about 12,000 RPM).

In certain embodiments, each high deactivation speed can be about the same as a next higher stage generator low activation speed, and each low deactivation speed can be about the same as a next lower stage generator high activation speed such that the controller 105 can be configured to activate one generator and deactivate another generator at the same speed. In certain embodiments, the various speeds can be selected to allow multiple generators to operate at the same time, e.g., for short transition periods. In certain embodiments, the high deactivation speed can be different from (e.g., greater than) the high activation speed of the same stage generator, and one or more of the low deactivation speed can be lower than the low activation speed of the same generator, e.g., for hysteresis. Any suitable speeds for any suitable outcome of generator operation is contemplated herein and are appreciated by those having ordinary skill in the art in view of this disclosure without undue experimentation.

Referring additionally to FIG. 2, in certain embodiments, the first shaft 113 can be connected to an input shaft 117 via a first gear assembly 119 (e.g., including first shaft gear 119a and first input shaft gear 119*b*) having a first gear ratio (e.g., as shown in FIG. 3). In certain embodiments, the second shaft 115 can be connected to an input shaft 117 via a second gear assembly 121 (e.g., including second shaft gear 121*a* and second input shaft gear 121*b*) having a second gear ratio (e.g., as shown in FIG. 3). Gearing can provide different ratios of input speed to generator speed as desired, e.g., as shown in differing slopes in FIG. 3.

The first generator 101 and/or the second generator 103 and/or the third generator 111 and/or any additional generator(s) can be connected to (e.g., directly or indirectly) a low pressure spool of a turbomachine to be driven by the low pressure spool of the turbomachine (e.g., of an aircraft). Any other suitable spool or power source is contemplated herein.

Referring additionally to FIG. 3, in certain embodiments, the first speed range 301 can partially overlap with the second speed range 303, but not with the third speed range 305. The third speed range 305 can partially overlap with the second speed range 303.

The controller 105 can be configured to switch between each generator 101, 103, 111 within an overlapping speed range, for example. The controller 105 can be configured to provide generator switching control hysteresis such that each low activation speed is higher than a respective low deactivation speed. In certain embodiments, however, each high activation speed can be about the same as each high deactivation speed, and each low deactivation speed can be about the same as each low activation speed. Any suitable activation and deactivation speeds are contemplated herein (e.g., the limits of each speed range, one or more points within a speed range, etc.).

The controller 105 can include any suitable hardware and/or software modules configured to perform any function and/or method disclosed herein. Any suitable method herein and/or portions thereof can be stored on a computer readable medium and executed by any suitable computer.

In accordance with at least one aspect of this disclosure, a method can include controlling at least a first generator and a second generator attached to a low speed spool of a turbomachine to output a predetermined output characteristic. The first generator can be configured to operate in a first speed range to produce a predetermined output characteristic. The second generator can be configured to operate at a second speed range different from the first speed range to produce the predetermined output characteristic.

Controlling can include deactivating the first generator at and/or above a first high deactivation speed within the first speed range, and activating the second generator at and/or above a second low activation speed within the second speed range. Activating can include providing excitation energy to a respective generator. Deactivating can include not providing excitation energy to the respective generator. Controlling can include activating only a single generator in an overlapping speed range.

In accordance with at least one aspect of this disclosure, a method for providing an electrical output having a predetermined characteristic can include switching between a plurality of generators connected to a low pressure spool of a turbomachine as a function of speed to produce the electrical output having the predetermined characteristic. Any other suitable methods and/or portions thereof are contemplated herein.

Embodiments can utilize multiple variable frequency generators (VFGs), e.g., with differing pole counts, which all can be packaged inside of a common housing. The use of differing pole counts allows the generators to produce the desired output frequencies within their respective speed ranges. Embodiments allow an entire low spool speed range to be covered by the generator system where previous technologies could not cover such a wide range. Gears can be used to convert low spool engine output speeds into appropriate input speeds for each VFG. A PMG can provide excitation power to each VFG, e.g., as allowed by the controller 105. External loads can be managed by power distribution equipment.

Embodiments provide multiple generators that can be switched on and off to power the proper generator as a function of speed of the input source. Any suitable number of generator stages is contemplated herein (selected as a function of low spool engine speed range, e.g., two for 5 to 1 range, more than three for large ranges such as over 8 to 1). Embodiments allow aircraft primary electrical power to be extracted from the low spool engine. A benefit of this is that the generator does not require a separate shifting transmission or speed control device to provide the necessary input speed range to the generator, for example.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A system, comprising:
a first generator configured to operate in a first speed range to produce a predetermined output characteristic;
a second generator configured to operate at a second speed range different from the first speed range to produce the predetermined output characteristic; and
a controller configured to activate the first generator at and/or above a first low activation speed and at and/or below a first high activation speed within the first speed range, wherein the controller is configured to activate the second generator at and/or above a second low activation speed within the second speed range, wherein the controller is configured to deactivate the first generator at and/or above a first high deactivation speed, wherein the controller is configured to deactivate the second generator at and/or below a second low deactivation speed, wherein the controller is configured to provide excitation energy to the first generator at and/or above the first low activation speed and at and/or below the first high activation speed within the first speed range, wherein the controller is configured to provide excitation energy to the second generator at and/or above the second activation speed in the second speed range to operate each of the first generator or the second generator as a function of speed.

2. The system of claim 1, wherein the first generator and second generators are variable frequency generators.

3. The system of claim 1, further comprising a permanent magnet generator (PMG) connected to the controller to provide the excitation energy.

4. The system of claim 3, wherein the first generator and the PMG are connected to a first shaft.

5. The system of claim 3, wherein the first generator is connected to a first shaft and the second generator is connected to a second shaft different from the first shaft.

6. The system of claim 5, further comprising a third generator connected to the second shaft with the second generator, wherein the third generator is configured to operate in a third speed range different from the first and second speed ranges to produce the predetermined output characteristic, wherein the controller is configured to activate the third generator at a third low activation speed in the third speed range and to deactivate the third generator at a third low deactivation speed, wherein the controller is configured to deactivate the second generator at and/or above a second high deactivation speed and to activate the second generator at and/or below a second high activation speed.

7. The system of claim 6, wherein the first shaft is connected to an input shaft via a first gear assembly having a first gear ratio, and the second shaft is connected to an input shaft via a second gear assembly having a second gear ratio.

8. The system of claim 6, wherein the first speed range partially overlaps with the second speed range, but not with the third speed range, wherein the third speed range partially overlaps with the second speed range.

9. The system of claim 8, wherein the controller is configured to switch between each generator within an overlapping speed range.

10. The system of claim 9, wherein the controller is configured to provide generator switching control hysteresis such that each low activation speed is higher than a respective low deactivation speed.

11. The system of claim 5, wherein each high deactivation speed is about the same as a next generator low activation speed, and wherein each low deactivation speed is about the same as a next generator high activation speed such that the controller is configured to activate one generator and deactivate another generator at the same speed.

12. The system of claim 1, wherein the first generator and the second generator are connected to a low speed spool of a turbomachine to be driven by the low speed spool of the turbomachine.

13. The system of claim 1, wherein each high activation speed is about the same as each high deactivation speed, and each low deactivation speed is about the same as each low activation speed.

14. A method, comprising:
controlling at least a first generator and a second generator attached to a low speed spool of a turbomachine to output a predetermined output characteristic, wherein the first generator is configured to operate in a first speed range to produce a predetermined output characteristic, and wherein the second generator is configured to operate at a second speed range different from the first speed range to produce the predetermined output characteristic, wherein controlling includes deactivating the first generator at and/or above a first high deactivation speed within the first speed range, activating the second generator at and/or above a second low activation speed within the second speed range, wherein activating comprises providing excitation energy to a respective generator, and wherein deactivating includes not providing excitation energy to the respective generator.

15. The method of claim 14, wherein controlling includes activating only a single generator in an overlapping speed range.

16. A system, comprising:
a first generator configured to operate in a first speed range to produce a predetermined output characteristic;
a second generator configured to operate at a second speed range different from the first speed range to produce the predetermined output characteristic; and
a controller configured to activate the first generator at and/or above a first low activation speed and at and/or below a first high activation speed within the first speed range, wherein the controller is configured to activate the second generator at and/or above a second low activation speed within the second speed range, wherein the controller is configured to deactivate the first generator at and/or above a first high deactivation speed, wherein the controller is configured to deactivate the second generator at and/or below a second low deactivation speed, wherein each high activation speed is about the same as each high deactivation speed, and each low deactivation speed is about the same as each low activation speed.

* * * * *